United States Patent [19]

Cole

[11] 3,857,443

[45] Dec. 31, 1974

[54] SEALANT

[75] Inventor: Robert C. Cole, Duncan, Okla.

[73] Assignee: Halliburton Company, Duncan, Okla.

[22] Filed: July 29, 1971

[21] Appl. No.: 167,447

Related U.S. Application Data

[62] Division of Ser. No. 771,631, Oct. 29, 1968, Pat. No. 3,649,574.

[52] U.S. Cl..................... 166/295, 61/36 R, 61/41
[51] Int. Cl...... E21b 33/13, E21b 33/14, E21d 5/11
[58] Field of Search.................. 61/36 R, 35, 40, 41; 166/295, 292, 299, 281

[56] References Cited
UNITED STATES PATENTS

| | | | |
|---|---|---|---|
| 3,374,834 | 5/1968 | Ramos et al. | 61/35 R |
| 3,418,813 | 12/1968 | Dillon | 61/36 R X |
| 3,447,608 | 6/1969 | Fry et al. | 166/295 X |
| 3,493,529 | 2/1970 | Krottinger et al. | 166/295 X |
| 3,511,313 | 5/1970 | Eilers et al. | 166/295 |
| 3,557,562 | 1/1971 | McLauglin, Jr. et al. | 166/295 X |

*Primary Examiner*—Stephen J. Novosad
*Attorney, Agent, or Firm*—John H. Tregoning; Fred E. Hook; Thomas R. Weaver

[57] ABSTRACT

This invention relates to a flexible sealant, capable of setting in the absence of a polymerization catalyst, comprising an acrylamide monomer, a polyfunctional crosslinking agent such as an alkylidene bisacrylamide, a polyol containing at least three hydroxyl groups such as glycerol and a diol such as ethylene glycol. The sealant is particularly useful in grouting applications where high electrical resistivity is desired and may be used for stabilizing soil, consolidating loose sand, grouting and bridging or plugging openings of vugular and/or fractured formations.

21 Claims, No Drawings

SEALANT

This is a division of application Ser. No. 771,631, filed Oct. 29, 1968 now U.S. Pat. No. 3,649,574.

BACKGROUND OF THE INVENTION

Underground explosions and especially nuclear explosions have recently been carried out to study the characteristics of nuclear devices. Additionally, an underground explosion may be used to form a large underground cavity for storing materials such as natural gas and to melt and recover various materials which are normally mined by more conventional techniques.

In order to place the explosive charge into the ground, a hole must be drilled. The force of the shock wave is countered by filling the hole with gravel or a similar material. This stemming material is usually porous and does not prevent the escape of gases containing radioactive by-products of the nuclear explosion. Thus, in addition to the gravel, it is necessary to have a sealing material that will prevent the escape of radioactive materials and yet be flexible enough to withstand the shock wave. The sealant must also be easy to remove so that access to the explosion chamber can be readily obtained after the explosion has occurred.

The sealant should also be nonhydrocarbon so that it is inert to polyvinyl chloride and rubber which are used to insulate wires carrying instrumentation from the surface of the earth down the hole and into the test chamber. The sealant must be nonthermoplastic and must also have low inflammability because high temperatures are encountered. It must also have thermal properties such that the exotherm from the polymerization does not raise the temperature above 125° F. which would cause damage to the wires going through the sealant. Shrinkage must be at a minimum in order to preserve a tight seal. The gel time of the sealant must be long enough to allow for mixing and placement of the sealant and yet rapid enough so that there is not seepage into the lower gravel pack or bed. Finally, the sealant must have low galvanic action and the electrical resistivity should be at least about 50,000 ohm-centimeters to prevent absorbing of radio signals.

Normally, grouting or soil stabilizing compositions which might be used as flexible sealants and for other subterranean uses are originally in the liquid state and require a catalyst to cause the sealing composition to gel or harden.

SUMMARY OF THE INVENTION

It is an object of the present invention to provide a flexible sealing material which does not require addition of a catalyst.

It is a further object of the present invention to provide a flexible sealing material which will not rupture when subjected to a shock wave.

A further object is to provide a flexible sealing material which has a high electrical resistivity.

Another object of the present invention is to provide a flexible sealing material which is inert to conventional wire insulation coverings.

Still another object of the present invention is to provide a sealing or grouting material where a nondehydrating grout is needed or desired.

Yet another object of the present invention is to provide a sealing material for sealing joints in discharge lines, and drawdown tubes from dams and other water reservoirs which are dry for a portion of the year and wet for another portion; for sealing certain types of sewer joint grouting; and, for sealing certain types of sewer joint grouting; and, for sealing joints in manholes where the joints are above the water table for a portion of the year.

These and further objects of the present invention will be more readily understood by reference to the description and examples which follow.

Briefly, the present invention comprises a flexible sealant comprising an acrylamide monomer, a polyfunctional crosslinking agent such as an alkylidene bisacrylamide, a polyol containing at least three hydroxyl groups such as glycerol and a diol such as ethylene glycol. It has been found that the presence of the polyol causes the composition to gel without the necessity of having a catalyst present in the composition. The resulting gelled composition provides a flexible sealant of high electrical resistivity for underground formations.

DESCRIPTION OF PREFERRED EMBODIMENTS

The flexible sealant of the present invention is obtained by polymerizing an acrylamide monomer in the presence of a polyfunctional crosslinking agent and a polyol. Prior to adding the monomer and crosslinking agent to the polyol, both the acrylamide monomer and the crosslinking agent should be dissolved in a diol such as ethylene glycol. After addition of the polyol, the resulting mixture may be introduced into a cavity to be sealed. In the cavity, the mixture will polymerize without the necessity of adding a catalyst.

The monomer used in the flexible sealant polymerizes, resulting in gelation of the fluid. It is important that the monomer be one which exhibits hydrogen bonding in order to produce the necessary flexibility. Especially suitable monomers are the acrylamide monomers described in Koch U.S. Pat. No. 3,223,163 and having the structure

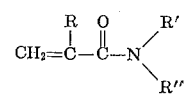

where R is either H or $CH_3$, $R'$ is either H or an alkyl group, and $R''$ is either H or an alkyl group. Although acrylamide and substituted acrylamides are preferred, many other monomers are suitable in practicing the present invention. Other monomers include those listed in Roth U.S. Pat. No. 2,801,985, Morgan U.S. Pat. No. 2,801,984 and Rakowitz U.S. Pat. No. 2,940,729, which do not ionize significantly in a polyol solvent and which are soluble in a polyol solvent. The disclosures of the four above-mentioned patents are incorporated herein by reference. In general, the amount of monomer may vary from about 2% to about 25% by weight of the mixture.

In order to form a gel, it is necessary to include a crosslinker for the monomer. In general, any polyfunctional monomer such as polyethylenic compounds may be used. A preferred crosslinking material is N,N'-methylenebisacrylamide. Other crosslinking materials which may be used in place of the N,N'-methylenebisacrylamide are disclosed in Roth U.S. Pat. No. 2,801,985, Morgan U.S. Pat. No. 2,801,984 and Rakowitz U.S. Pat. No. 2,940,729. In addition, other crosslinking materials such as triallyl phosphate, diallylfumarate, etc., wherein there are seven or more atoms in the chain between the double bonds of these polyfunctional crosslinking agents, may be employed. Additionally, other compounds which do not fit into this category may also be used. Typical of such compounds are N,N-diallylacrylamide. Such compounds are disclosed in McLaughlin U.S. Pat. No. 3,334,689, the disclosure of which is hereby incorporated into this application by reference. The amount of crosslinking agent should be sufficient to form a gel and normally will vary from about 0.1% to about 10% by weight based upon the weight of the monomer used. Preferably, the amount of crosslinking agent should vary from about 1% to about 5% by weight based upon the weight of the monomer.

Another component of the composition of this invention is a diol. The diol is used to dissolve the monomer and crosslinking agent. Additionally, the diol makes the mixture inert to rubber and other insulating materials for electrical wires which may pass through the flexible sealant and increases the electrical resistance of the sealant. The preferred diol is ethylene glycol but other diols such as diethylene glycol, triethylene glycol, and other glycols in this series to polyethylene glycol, propylene glycol, 1,4-butene glycol, etc., may be used. The diol is present in an amount such that the weight ratio of diol to monomer is between about 1:1 to about 5:1. Preferably, the diol to monomer ratio is about 2:1.

To the solution of monomer and crosslinking agent in diol is added a polyol containing at least three hydroxyl groups. The primary function of the polyol in this composition is to cause the acrylamide monomer and crosslinker to gel. This gel promoting function of the polyol is unexpected and it is not yet known exactly in what manner the polyol functions to promote gelling. The preferred polyol is glycerol. However, other polyols containing at least three hydroxyl groups such as those in the homologous series, glycerol through the hexane hexols, e.g., sorbitol and manitol, may be used. In addition to promoting gellation of the acrylamide monomer, the polyol also acts to make the sealant composition inert to rubber and it increases the electrical resistivity of the sealant. The weight ratio of polyol to acrylamide monomer may vary from about 2 : 1 to about 20 : 1 with the preferred ratio being about 10 : 1.

As previously indicated, it is important that the monomer and crosslinking agent be first dissolved in a diol before addition of the polyol. If the polyol is added directly to the mixture of monomer and crosslinking agent, gellation will be essentially instantaneous and thus difficult to control. Of course, in some applications, a rapid gelling time is desirable. The presence of the diol apparently delays the promoting action of the polyol. In placing the grouting fluid or sealant of this invention, the polyol may be added to the composition prior to injection below the surface of the earth. On the other hand, a two-stream method of placement may be used wherein one stream containing the monomer and crosslinking agent dissolved in diol is introduced below the surface of the earth into the area which is to be sealed or consolidated and a second stream containing the polyol is introduced into the same area. Then, if adequate mixing occurred, a suitable sealant would be obtained.

An important use of the flexible sealant is as a part of the stemming material filling the access shaft of a chamber in which a high shock wave and pressure are generated. A typical use is in the access shaft for an underground explosion such as an underground nuclear explosion. Underground nuclear explosions may be used to determine the explosive characteristics of the nuclear device to form a large underground cavern, or in connection with recovery of underground oil, minerals, etc. The test chamber in which the explosion occurs is usually connected to the surface of the earth by a long shaft. Especially in the case of nuclear explosions, it is important to prevent the escape of the radioactive by-products of the nuclear explosion. The force of the shock wave is countered by filling the access shaft with gravel or some other material. However, this filling or stemming material is normally porous and will not prevent the escape of gases bearing radioactive materials. Thus, in addition to the gravel or other filling material, it is necessary that there be a sealing material which will not allow gases to escape. The sealing material must be flexible so that it is not fractured by the shock waves.

An important use of the sealing material of the present invention is in the sealing of an access shaft to an underground explosion chamber. A typical arrangement for an underground explosion includes a mined out chamber formed below the surface of the earth in which a nuclear explosive is inserted. Various wires or other sensing means are normally present in the chamber to monitor the results of the explosion. These wires are carried to the surface of the earth by means of insulated cables. A vertical access shaft connects the explosion chamber with the surface of the earth and provides a passage for the wires. In order to prevent the force of the explosion from being directed out the access shaft, the access shaft is normally filled with gravel or similar material to stem the shock wave. Since the gravel-type material is porous and thus will not prevent the escape of gases carrying radioactive materials, a sealant is necessary.

Normally, the sealant is placed in the access shaft with gravel both above and below it. Preferably, the height of the column of sealant is at least about 20 feet and may be as much as 200 feet. In sealing the access shaft, gravel is first put in place in the lower portion of the shaft. Then the unpolymerized sealant material is mixed and poured into the shaft. The mixture at once begins to polymerize and after a given amount of time will polymerize and crosslink to form the sealing gel. The gelling time is varied by varying the concentration of monomer, crosslinker and catalyst. After the sealant has polymerized, the remainder of the shaft may be filled up with gravel. At the time the unpolymerized sealant is introduced into the shaft, it has a sufficient viscosity due to the presence of the filler material so that it does not diffuse into the lower bed of gravel but instead stays in a confined area above the gravel bed.

Another use of the sealing material of the invention is filling voids in the wall around a missile silo. The missile silo comprises a hole which has been drilled in the ground and a steel casing which is placed into the hole and bonded to the walls of the hole. Voids may be present in the formation and also between the formation and the cement. It is preferred that the material filling the voids have a high electrical resistance so that it does not interfere with radio signals. To fill these voids, the flexible sealant of the present invention is introduced into the formation using conventional grouting techniques. If the pores into which the sealant is introduced are extremely fine, it may be necessary to eliminate the filler from the composition. Elimination of the filler will, of course, reduce the flexibility and shock resistance of the sealant but the formation itself will function as a filler to some extent.

Another application of the flexible sealant is to form gaskets or belts in the annulus between a well casing and the hole. The gaskets find use in wells wherein the casing is expected to move. Movement of the casing may be caused by thermal expansion and contraction in a secondary steam injection well in an oil field, because of high thermal stresses from other sources, because of mechanical stresses, etc. The stress on the casing is likely to break the brittle bond between the cement and the casing. This will defeat one of the primary purposes of the cement, the prevention of water circulation up and down in the annular space between the casing and the formation. When used in steam injection wells, direct contact of the sealant with steam should be avoided.

When gaskets or belts of flexible sealant are placed in the annulus between sections of conventional cement, any water seepage will encounter the flexible sealant belt as the water attempts to travel up and down the annular space. The bond between the casing and the flexible sealant will not be broken due to the flexibility of the sealant and thus further migration of the water will be prevented. Also, in the event that the sealant is broken, it will tend to swell in the water and effectively plug any water channels which might have existed.

The gaskets or belts of flexible sealant in the casing-formation annulus may be formed by introducing a volume of sealant between volumes of cement during the cementing operation. The amount of sealant should be such that it will form an annular belt about 5 to 1,000 feet high and preferably about 20 to 100 feet high.

The present invention may be more fully understood by reference to the following examples.

EXAMPLE 1

A sealant composition was prepared by dissolving 9.5 grams of acrylamide and 0.5 grams of N,N'-methylenebisacrylamide in 18 grams of ethylene glycol. To this solution was then added 72 grams of 99% glycerol. The initial viscosity of the composition was 160 centipoises at 72° F. After 24 hours, the sealant was a clear, white gel having a penetrometer reading of 159, a flash point of 252° F. and a resistivity of approximately 1,000 ohm meters.

EXAMPLE 2

The gel times for compositions containing varying amounts of N,N'-methylenebisacrylamide were determined. Varying amounts of acrylamide monomer and N,N'-methylenebisacrylamide were dissolved in ethylene glycol. The ethylene glycol solution was then added to varying amounts of glycerol and the time required to form a gel was determined. Table I below sets forth the results obtained. The amounts of material are given in parts by weight. Runs 3–6 each contained about 4 parts by weight of water.

TABLE I

| Run | Acrylamide | * | Colgate 99% Glycerol | Ethylene Glycol | Gel Time (min.) |
| --- | --- | --- | --- | --- | --- |
| 1 | 9.5 | 0.5 | 90 | — | 0 |
| 2 | 9.5 | 0.5 | 66 | 18 | 5** |
| 3 | 7.69 | 0.31 | 70 | 18 | 13 |
| 4 | 7.76 | 0.24 | 70 | 18 | 20 |
| 5 | 7.84 | 0.16 | 70 | 18 | 40 |
| 6 | 7.92 | 0.08 | 70 | 18 | 86 |

*N,N'-methylenebisacrylamide
**Subsequent testing disclosed gel times of 3 to 190 minutes with this particular formulation.

It should be noted that wide variation in gel times occurs with the use of different grades of glycerol. The purity and water content of the glycerol is a partial determinant of the gel times.

EXAMPLE 3

The gel times for compositions containing various amounts of sorbitol and glycerol using N,N'-methylenebisacrylamide and triallyl phosphate as crosslinking agents were determined. Two basic mixing techniques were used to produce the formulations set forth in Table II hereinafter. In runs 1, 2, 4 and 7, the acrylamide and the crosslinkers were dissolved in a polyol solution. In runs 3, 5, 6, 8 and 9, a one step preparation was used in which acrylamide and the crosslinkers were dissolved in the polyol solution.

The premixture of 95% acrylamide and 5% N,N'-methylenebisacrylamide was used in all formulations requiring the presence of both compounds.

The triallyl phosphate crosslinker was dissolved in the same operation as the monomer, but the triallyl phosphate and the monomer were always added separately to either diol or the polyol.

Sorbitol which is a solid at 75° F. was incorporated into formulations by using either a commercially prepared 70% solution in water, or a laboratory prepared 50% solution in ethylene glycol. The sorbitol-ethylene glycol solution was prepared by heating a mixture of solid sorbitol and liquid ethylene glycol in equal parts by weight of the two substances at 150° F. All components were 75° F. when the final sealant formulations were prepared.

Table II below shows the results obtained. The amounts of materials are given in per cent by weight. The curing temperature was 75° F. except for runs 8 and 9 in which the temperature was 120° F.

TABLE II

| Run | Monomer Acrylamide | Crosslinker | Polyol | Diol Ethylene Glycol | Gel Time (min.) |
| --- | --- | --- | --- | --- | --- |
| 1 | 9.5 | 0.5* | 72*** | 18 | 3 |
| 2 | 9.5 | 0.5* | 72**** | 18 | >24 hrs. |
| 3 | 9.5 | 0.5* | 90**** | 0 | >24 do. |
| 4 | 9.5 | 0.5* | 72***** | 18 | >24 do. |
| 5 | 9.5 | 0.5* | 90***** | 0 | >24 do. |
| 6 | 9.0 | 1.0** | 90**** | 0 | 90 |
| 7 | 9.0 | 1.0** | 72*** | 18 | 120 |
| 8 | 9.0 | 1.0** | 90**** | 0 | >24 hrs. |
| 9 | 8.0 | 2.0** | 90**** | 0 | 110 |

*N,N'-methylenebisacrylamide
**Triallyl phosphate
***Glycerol (Colgate) - 99%
****Sorbitol (Pfizer) - 70%
*****50% Sorbitol in Ethylene Glycol It can be seen that the present invention is applicable to a wide variety of uses where a flexible sealant or grouting material is desired. Furthermore, the composition of the sealant may be varied widely within the guidelines set forth above. Thus, it should be understood that the above examples and description are merely illustrative and should not be considered as limiting the scope of the invention. The scope of the invention is limited only by the lawful scope of the appended claims which follow.

I claim:

1. A method of filling a void contained in an earth formation with a flexible material comprising dissolving an acrylamide monomer, which exhibits hydrogen bonding, and a polyfunctional crosslinking agent, selected from the group consisting of alkylidene bisacrylamide, polyethylenic compounds derived from allyl alcohol and mixtures thereof, in a diol, selected from the group consisting of ethylene glycol, diethylene glycol, triethylene glycol, polyethylene glycol, propylene glycol, 1,4-butene glycol and mixtures thereof; mixing the resulting solution with a polyol containing at least three hydroxyl groups; and injecting the resulting composition into a void in an earth formation.

2. The method of claim 1 wherein said composition is introduced into a void connecting an underground chamber, wherein an explosion is to be detonated, with the surface of the earth.

3. The method of claim 2 wherein said composition is placed between layers of gravel in said void.

4. The method of claim 2 wherein electrical cables, connecting the explosion chamber with the surface of the earth, are encased by said sealant.

5. The method of claim 2 wherein Portland cement is first introduced into said void and then said composition is injected into said void.

6. The method of claim 1 wherein said composition is injected into the voids in the wall around a casing.

7. The method of claim 6 wherein said casing is a missile silo.

8. The method of claim 1 wherein said composition is injected into a casing-formation annulus to form annular sections of a flexible sealant between a casing and a formation wall.

9. The method of claim 8 wherein said composition and cement are introduced into a casing-formation annulus whereby alternating annular sections of cement and said composition are formed in said casing-formation annulus.

10. The method of claim 1 wherein said acrylamide monomer has the formula

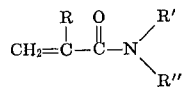

wherein $R$ is either H or $CH_3$, $R'$ is either H or an alkyl group and $R''$ is either H or an alkyl group.

11. The method of claim 1 wherein said monomer is acrylamide.

12. The method of claim 1 wherein said crosslinking agent is N,N'-methylenebisacrylamide.

13. The method of claim 1 wherein said diol is ethylene glycol.

14. The method of claim 1 wherein said polyol is glycerol.

15. The method of claim 1 wherein said composition contains a filler which will form hydrogen bonds with said polymer.

16. The method of claim 1 wherein said filler is selected from the group consisting of silica, wood flour, bauxite, talc, scoria and mixtures thereof.

17. The method of claim 16 wherein said filler is silica.

18. The method of claim 1 wherein an acrylamide monomer having the structure

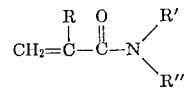

is dissolved along with a polyfunctional crosslinking agent in a diol, the amount of said crosslinking agent being from about 0.1% to about 10% based on the weight of said acrylamide and the weight ratio of said diol to said acrylamide being from about 1 : 1 to about 5 : 1, the resulting solution then being combined with a polyol, the weight ratio of said polyol to said acrylamide being from about 2 : 1 to about 20 : 1.

19. The method of claim 1 wherein said crosslinking agent is triallyl phosphate.

20. The method of claim 1 wherein said polyol is sorbitol.

21. A method of sealing joints in discharge lines, drawdown tubes from dams and water conservation reservoirs, sewer lines, manholes, and the like, by introducing thereinto a flexible material comprising dissolving an acrylamide monomer, which exhibits hydrogen bonding, and a polyfunctional crosslinking agent, selected from the group consisting of alkylidene bisacrylamides, polyethylenic compounds derived from allyl alcohol and mixtures thereof, in a diol, selected from the group consisting of ethylene glycol, diethylene glycol, triethylene glycol, polyethylene glycol, propylene glycol, 1,4-butene glycol and mixtures thereof; mixing the resulting solution with a polyol containing at least three hydroxyl groups.

* * * * *